3,466,258
NON-TACKY PUTTY COMPOSITIONS COMPRISING A LOW MOLECULAR WEIGHT POLYSULFIDE AND A HIGH MOLECULAR WEIGHT POLYSULFIDE ELASTOMER
Julian R. Panek, Newtown, Pa., and Donald K. Goodwin, Trenton, N.J., assignors to Thiokol Chemical Corporation, Bristol, Pa., a corporation of Delaware
No Drawing. Filed May 10, 1965, Ser. No. 454,726
Int. Cl. C08g 43/00; C09d 5/34
U.S. Cl. 260—30.8
5 Claims

ABSTRACT OF THE DISCLOSURE

A non-tacky putty composition is prepared by blending 100 to 1,500 parts by weight of one or more plasticizers, 100 to 1,500 parts by weight of one or more fillers, and about 1 to 20 parts by weight of a low molecular weight polysulfide polymer having a molecular weight of about 500 to 12,000 and having certain reactive terminal groups such as mercaptan, isocyanate and amine groups per 100 parts by weight of a high molecular weight elastomeric polymer having a molecular weight of about 50,000 to 200,000 such as polysulfide polymers, 1-butene homopolymer, isobutylene-isoprene and the like.

---

The present invention relates to novel compositions of matter based on high molecular weight crude rubbers which contain relatively high loadings of plasticizers and fillers and which have the property of being able to skin-over and become tack-free in a relatively short period of time and to processes for making such compositions.

High molecular weight crude rubbers have been used to make putties and mastics for various applications. Prior to the advent of the present invention many of these putty compositions remained tacky or sticky for long periods of time after the application thereof to the desired base structure. Because of their tacky or sticky surface, therefore, dust, dirt, and other foreign matter could readily contaminate such putty compositions, thereby marring the appearance of the putty. In addition, such surface tackiness may create handling problems and be messy to work with due to the putty adhering to workman's hands, clothes, etc., especially where the putty is applied by hand.

It is an object of the present invention to provide high molecular weight polymer based putties and mastics which possess the property of being able to skin-over and become tack-free in a relatively short period of time and to provide novel processes for the preparation of such high molecular weight polymer based putties and mastics.

It has now been unexpectedly found, according to the present invention, that putties and mastics with the above mentioned non-tacky properties can be prepared from elastomeric polymer based putty compositions by adding to such compositions a relatively small quantity of low molecular weight polysulfide polymer. The putty and mastic compositions of the present invention can be made to skin-over and become tack-free in a relatively short period of time after their exposure to the atmosphere. The skinning over begins immediately upon exposure to air and the tack-free skin can be expected to form in about an hour to 12 hours at room temperature, and generally in about one to two hours. The exact time will depend upon such factors as the relative amounts and types of basic polymer(s), plasticizer(s), and/or filler(s) used in the particular putty composition.

The term "tacky" or "tack" refers to the property of stickiness wherein there is a trace of surface adhesion between the putty composition and foreign materials which may come in contact with the putty surface. A tacky surface is one to which dirt or dust would readily stick.

The putty compositions of the present invention are those based upon certain high molecular weight elastomeric compounds. Examples of such elastomeric compounds which may be used in the present invention are 1-butene homopolymers, isobutylene-isoprene copolymer, styrene-butadiene copolymer, 2-chloro 1,3-butadiene homopolymer, saturated chlorosulfonated polyethylene polymer, and polysulfide polymers. The term "high molecular weight" as used herein means a molecular weight of from about 50,000 to 200,000. Polymers of the above types with such high molecular weights are normally solid materials at room temperature.

A preferred polymer base for the putty composition of the present invention are the polysulfide polymers. These polysulfide polymers are formed from inorganic alkaline polysulfides, organic dihalides and, optionally, cross-linking agents such as trichloropropane. The preparation of these polymers is disclosed in U.S. 2,392,402 and 2,466,963 and their use in a putty is disclosed in copending application Ser. No. 363,292 filed Apr. 28, 1964, in the name of E. F. Kutch.

The putty compositions of the present invention contain about 100 to 1,500, and preferably about 400 to 1,000 parts by weight of a suitable plasticizer, about 100 to 1,500, and preferably about 800 to 1,200 parts by weight of a suitable filler and about 1–20 and preferably about 5 parts by weight of a suitable low molecular weight liquid polysulfide polymer per 100 parts by weight of the high molecular weight elastomeric polymer therein. The exact amount of low molecular weight polysulfide polymer which should be incorporated in the putty composition to obtain the desired "skinning over" property depends somewhat upon the other ingredients in the particular composition; however, if the amount of low molecular weight polysulfide polymer in the composition exceeds about 20 parts by weight per 100 parts by weight of the high molecular weight polymer the putty composition is adversely effected and the putty composition becomes unstable and appears to "jell" thereby giving an ineffective caulking or putty composition.

The plasticizers which may be used in the compositions of the present invention are any of those which are compatible with the particular high molecular weight polymer base and low molecular weight polysulfide polymer being used in the putty composition. These plasticizers include materials such as pine tar, soy bean oil and soy bean oil vulcanized with rubber maker's sulfur, dibenzyl phthalate, phenyl cresyl phthalate, phenyl benzyl phthalate, butyl benzyl phthalate, dibutyl phenyl phosphate, tricresyl phosphate, butyl cyclohexyl phthalate, triphenyl phosphate, dibutyl phthalate, phenyl dicresyl phosphate, isooctyl diphenyl phosphate, di-2-ethylhexyl phenyl phosphate, diphenyl phthalate, dipropylene glycol dibenzoate, dibenzyl adipate, isodecyl diphenyl phosphate, isodecyl dicresyl phosphate, (butyl octyl) phosphate, tri-n-hexyl phosphate, butyl decyl phthalate, diisooctyl phthalate, di-2-ethylhexyl phthalate, di-n-octyl phthalate, di-n-octyl phenyl phosphate, di-2-ethylhexyl isophthalate, dibutoxyethyl adipate, dicapryl phthalate, diisodecyl phthalate, di-2-ethylhexyl hexahydrophthalate, di-n-nonyl phthalate, di-2-ethylhexyl terephthalate, hydrogenated terphenyl, di-n-decyl phthalate, dioctyl adipate, di-2-ethylhexyl azelate, alkyl aromatic hydrocarbons, ditridecyl phthalate, di-2-ethylhexyl sebacate, diisodecyl adipate, di-n-decyl adipate, dibutyl carbitol formal, dibutyl carbitol adipate, castor oil, diethyl phthalate, ethyl phthalyl ethyl glycolate, dicyclohexyl phthalate, epoxidized linseed oil, chlorinated biphenyls, coal tars, coumarone-indene resins and coumarone-indene resin/coal tar polymers, dibutoxyethoxy ethyl adipate, dibutoxyethoxy ethyl formate, terphenyl compounds, vasoline, aromatic petroleum hydrocarbons and polymerized aromatic petroleum resins and aromatic hydrocarbon oils.

The fillers which may be used in the compositions of the present invention are those materials which have been used by those in the art in sealant, caulking and putty composition. These filler materials include clay materials such as bentonite, titanium dioxide, barium sulfate, carbon black, silica, zinc carbonate, zinc sulfide, magnesium silicate, calcium carbonate, calcium silicate, calcium sulfate, diatomaceous earth, iron oxide, magnesium silicate, and zinc oxide.

The low molecular weight polysulfide polymers which may be added to the putties of the present invention are mercaptan terminated polymers such as those disclosed in U.S. 2,466,963; isocyanate terminated polymers such as those disclosed in copending application Ser. No. 310,925 filed Sept. 23, 1963, by E. F. Kutch, now abandoned; "high-rank," (—SSH) terminated, polymers such as those disclosed in copending application Ser. No. 290,637 filed June 26, 1963, by E. R. Bertozzi, now abandoned; "high rank," (—SSH) blocked with hemiacetal or hemiketal groups, terminated polymers such as those disclosed in copending application Ser. No. 302,724 filed Aug. 16, 1963, by E. R. Bertozzi, now abandoned; and amine (—NH$_2$) terminated polymers such as those disclosed in U.S. 2,606,173 and in Ser. No. 398,422 filed Sept. 22, 1964, by E. R. Bertozzi, now U.S. Patent 3,331,816. These polymers have a molecular weight of about 500 to 12,000 and are liquid, i.e., pourable, at room temperature (about 25° C.). Structurally, they may be represented by the formula $FR^IS_x(RS_x)_mR^IF$ wherein $x$ is an integer of from 1 to 5; $m$ is an integer of from 1 to about 100; R and $R^I$ are bivalent aliphatic radicals wherein the carbon atoms may be interrupted with oxygen atoms; and F may be an —SSH group; a hemiacetal or hemiketal group of the structure

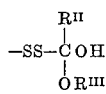

wherein $R^{II}$ may be H or a lower alkyl group and wherein $R^{III}$ may be a lower alkyl group; an —SH group; or an —NH$_2$ group; an

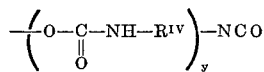

group wherein $R^{IV}$ is selected from alkylene and arylene groups, and $y$ is an integer of at least 2 and preferably 2 to 15.

The putty compositions of the present invention may be prepared using conventional methods such as that disclosed in application Ser. No. 363,292, filed Apr. 28, 1964, in the name of E. F. Kutch, now abandoned, for producing putties and caulking compounds by using conventional mixing or rubber mill equipment. Thus, it is possible to first band the high molecular weight elastomer on a rubber mill, then masticate the branded rubber on the rubber mill with a small amount of the plasticizer, of the order of about 50 to 160 parts by weight and, optionally, a minor portion of the intended filler charge, of the order of about 250 to 350 parts by weight, per 100 parts by weight of high molecular weight elastomer to facilitate the subsequent admixing of loadings of plasticizer and filler in quantities as desired. The mixing operation may be conducted at ambient temperatures and may be continued, after milling in the initial small portions of plasticizers and fillers as indicated above, in a vaned mixing apparatus to facilitate the admixing of the balance of the desired plasticizer and filler loading.

A preferred method due to increased efficiency and economy, however, is to place all of the high molecular weight elastomeric polymer, in the form of crumbs up to ½″ in diameter, all or most of the plasticizer, and all of the low molecular weight polysulfide polymer additive in a single container and then to heat to a temperature from about room temperature (70° F.) to about 170° F. for a time period of from about 8 to 20 hours until the unmixed ingredients have become swollen and softened and form a gelled mass.

At the end of this heating period all of the filler and any remaining plasticizer is added to the thus formed gelled composition and the batch is further mixed until a relatively uniform mixture is obtained which ordinarily will take from about 10 minutes to about one hour and preferably from about 15 minutes to 30 minutes. Upon cooling, the admixture is in the form of a gunnable putty suitable for use. Due to the rapid forming non-tacky surface these putty compositions are particularly suited for hand application where a lump of putty is held in one hand and applied with the other hand.

The putties and mastic materials, which are the subject of the present invention, are non-drying materials which have excellent adhesion to steel, wood, glass, concrete and other substances. While these materials have a putty consistency, they still retain the rubber-like properties of the high molecular weight polymers. The putties and mastic materials of the present invention may be used as caulking compounds, as well as, in the general area of applications for which putty and mastic materials are commonly employed. The putties produced according to the present invention are storage stable and when exposed to the atmosphere will "skin over" to produce a tack-free surface in about one to two hours at room temperature.

Other additives commonly used in putty and mastic compositions can be incorporated into the putty and mastic compositions of the present invention including adhesive additives such as phenolic resins, acrylate resins and silane compounds, pigments, and perfumes.

The following examples are merely illustrative of the present invention and are not intended as a limitation upon the scope thereof.

Example 100 parts by weight of a high molecular weight polysulfide polymer of about 100,000 molecular weight, which had been prepared by reacting sodium polysulfide with a mixture of dichlorodiethyl formal and ethylene dichloride, 300 parts by weight of Arochlor 1248 (a chlorinated biphenyl which contains 48% chlorine), 50 parts by weight of Acryloid B-82 (an acrylate resin which is in solution with toluene as solvent), a container which was then placed in an oven heated to a temperature of 158° F. for about 16 hours. The contents of the container, now in the form of a gelled mass, was placed in a Baker-Perkins mixer, at which times 350 parts by weight of CaCO$_3$, 150 parts by weight of magnesium silicate, and 110 parts by weight of toluene was added to the gelled mass to make a batch which was mixed for about 10 minutes. This material will be referred to as Putty #1. Putties #2-5 were made in a manner similar to that stated above for the preparation of Putty #1 except that for Putties #3, 4 and 5 mercaptan terminated polysulfide polymer of about 4,000 molecular weight and prepared according to the procedure of U.S. 2,466,963, was added to the container at the same time the high molecular weight polysulfide polymer, the Arochlor 1248, and Acryloid B-82 were added.

In Putties #3, 4 and 5 titanium dioxide pigment was added in the final admixing step. Putty compositions 1–5 were composed as follows:

| | Putty composition (parts by weight) | | | | |
|---|---|---|---|---|---|
| | 1 | 2 | 3 | 4 | 5 |
| High molecular weight polysulfide polymer | 100 | 100 | 100 | 100 | 100 |
| Mercaptan terminated polysulfide polymer of about 4000 molecular wt | | | 5 | 5 | 5 |
| Arochlor 1248 (48% chlorinated biphenyl) | 300 | 300 | 300 | 100 | 100 |
| CaCO₃ | 350 | 350 | 450 | 250 | 250 |
| Magnesium silicate | 150 | 150 | 150 | 150 | 150 |
| Titanium dioxide pigment | | | | 50 | 50 | 50 |
| Toluene | 110 | 60 | 60 | 60 | 60 |
| Arcyloid B-82 (solid acrylate resin in solution with toluene as solvent) | 50 | | 25 | 25 | |
| Percent total polymer | 9.4 | 10.4 | 9.2 | 14.3 | 11.5 |

Each of the compositions prepared above was tested for adhesion, gunability, sag properties, and "tack." The adhesion tests were conducted by placing beads of the material on glass, aluminum, steel and concrete panels, and allowing the beads to remain on the panels for about one week at room temperature. At the end of the week's time, the beads were tested for adhesion properties by attempting to remove them from the panels. All the beads showed good adhesion to all of the substrates.

Gunability is that property which allows a putty material to be readily extruded from a caulking gun apparatus. All of the putty compositions prepared above had good gunability properties.

Beads of each of the compositions prepared above were tested for sag properties by placing beads of each of the compositions on flat surface of panels and then standing the panels on eand with the beads vertical to the floor. All of the beads showed good sag resistant properties in that no sag was visible after the panels had been in this position for over one hour.

Tack is that property which is characterized by "stickiness" and may be determined by touch with the hand or some other object to which a tacky putty might tend to adhere. Putties #1 and 2 showed poor to no "tack-free" or "skinning-over" properties after about 24 hours. This lack of "skinning-over" was further evidenced by noticeable dirt pick-up. At the end of 2 hours, Putties #3–5, which contained low molecular weight polysulfide polymer had "skinned-over" and showed good tack-free properties; and no dirt pick-up was noticed during the 1 week testing period with these materials.

We claim:
1. A non-tacky putty composition consisting essentially of about 100 to 1,500 parts by weight of a chlorinated biphenyl, about 100 to 1,500 parts by weight of at least one filler, and about 1 to 20 parts by weight of a low molecular weight polysulfide polymer having a molecular weight of about 500 to 12,000 and being selected from the group consisting of mercaptan terminated polymers, isocyanate terminated polymers, amine terminated polymers, (—SSH) blocked with hemiacetal and hemiketal groups terminated polymers per 100 parts by weight of high molecular weight polysulfide polymer having a molecular weight of about 50,000 to 200,000.

2. A composition of material as in claim 1 which contains about 400 to 1,000 parts by weight of a chlorinated biphenyl and about 800 to 1,200 parts by weight of filler.

3. A composition as in claim 2 in which the filler is selected from the group consisting of calcium carbonate and magnesium silicate.

4. A process for preparing high molecular weight polysulfide polymer based putties and mastics comprising the steps of:
  (a) Combining about 100 to 1,500 parts by weight of a chlorinated biphenyl and about 1 to 20 parts weight of a low molecular weight polysulfide polymer with 100 parts by weight of a high molecular weight polysulfide polymer.
  (b) Heating the mixture prepared in step (a) at a temperature of about 70° F. to 170° F. until the combined ingredients are swollen and softened; and
  (c) Adding to the mixture prepared in step (b) about 100 to 1,500 parts by weight of at least one filler material per 100 parts of the high molecular weight polysulfide polymer and admixing the resultant composition in about 10 minutes to one hour.

5. A process as in claim 4 wherein said high molecular weight polysulfide polymer has a molecular weight of about 50,000 to 200,000.

References Cited
UNITED STATES PATENTS

| | | | |
|---|---|---|---|
| 2,465,512 | 3/1949 | Carasso | 260—79.1 |
| 2,466,963 | 4/1949 | Patrick et al. | 260—79.1 |
| 2,910,922 | 11/1959 | Horning | 260—28 |
| 3,225,017 | 12/1965 | Seegman et al. | 260—33.8 |
| 3,316,194 | 4/1967 | Payne et al. | 260—28 |

OTHER REFERENCES

Fettes et al., Industrial & Engineering Chemistry, "Polysulfide Polymers," vol. 42, November 1950, pp. 2217–2223.

Thiokol Bulletin, Synthetic Rubber and Chemicals, Crude Type FA. Special Crudes. Molding Powders. Thiokol Synthetic Rubber Type St. Received Nov. 5, 1947, p. FA7, and "Thiokol" Type St., pp. 6, 8 and 9.

ALLAN LIEBERMAN, Primary Examiner

U.S. Cl. X.R.

260—33.8, 41, 79.1, 823